United States Patent [19]

Saitoh et al.

[11] Patent Number: 4,926,274
[45] Date of Patent: May 15, 1990

[54] MAGNETIC HEAD APPARATUS HAVING SURFACES CONTOURED TO MINIMIZE FRICTION BETWEEN A MAGNETIC HEAD AND A MAGNETIC DISK

[75] Inventors: Mitsuyoshi Saitoh, Kanagawa; Kunio Sekine, Yokohama, both, Japan

[73] Assignee: Kabushiki Kaisha Toshiba, Kawasaki, Japan

[21] Appl. No.: 127,090

[22] Filed: Dec. 1, 1987

[30] Foreign Application Priority Data

Dec. 4, 1986 [JP] Japan .................................. 61-289284
Dec. 4, 1986 [JP] Japan .................................. 61-289286
Dec. 4, 1986 [JP] Japan .................................. 61-289287
Sep. 1, 1987 [JP] Japan .................................. 62-216319

[51] Int. Cl.$^5$ .............................................. G11B 5/60
[52] U.S. Cl. ...................................... 360/102; 360/103
[58] Field of Search .............. 360/103, 102, 104, 122, 360/121, 118

[56] References Cited

U.S. PATENT DOCUMENTS

| 3,678,482 | 7/1972 | Billawala ........................... 360/103 |
| 3,939,495 | 2/1976 | Nagai et al. ........................ 360/103 |
| 4,058,846 | 11/1977 | Knutson et al. ................... 360/118 |
| 4,214,287 | 7/1980 | Stromsta et al. .................. 360/103 |
| 4,691,260 | 9/1987 | Hosaka et al. .................... 360/118 |

FOREIGN PATENT DOCUMENTS 0164469 10/1982 Japan .................................. 360/103
60-55509 3/1985 Japan .
0239962 11/1985 Japan .................................. 360/103

*Primary Examiner*—David J. Severin
*Attorney, Agent, or Firm*—Oblon, Spivak, McClelland, Maier & Neustadt

[57] ABSTRACT

A magnetic head for recording and reproducing data, on and from a flexible magnetic disk, is supported by a support mechanism. The support mechanism is capable of rotating the head around the first axis extending in a radial direction of the disk, and applies a pressing force to the head. The head has leading and trailing edges. The head includes a flat surface opposing the disk and having a leading and trailing ends, and a midpoint between thereof. A second surface connects the trailing edge to the trailing end of the flat surface. The distance between the trailing edge and the disk is longer than the distance between the trailing end of the flat surface and the disk. Magnetic gaps are arranged on that portion of the flat surface which is located between the midpoint and the trailing end thereof. When the disk is rotated at a predetermined speed and the support mechanism applies a predetermined pressing force to the head, an air bearing force is generated and acts on the flat surface. Thus, the head is slightly rotated around the first axis such that the leading end moves away from the disk and the trailing end is pressed onto the disk. That portion of the flat surface can contact the disk, so that the magnetic gaps are located sufficiently close to the disk.

31 Claims, 12 Drawing Sheets

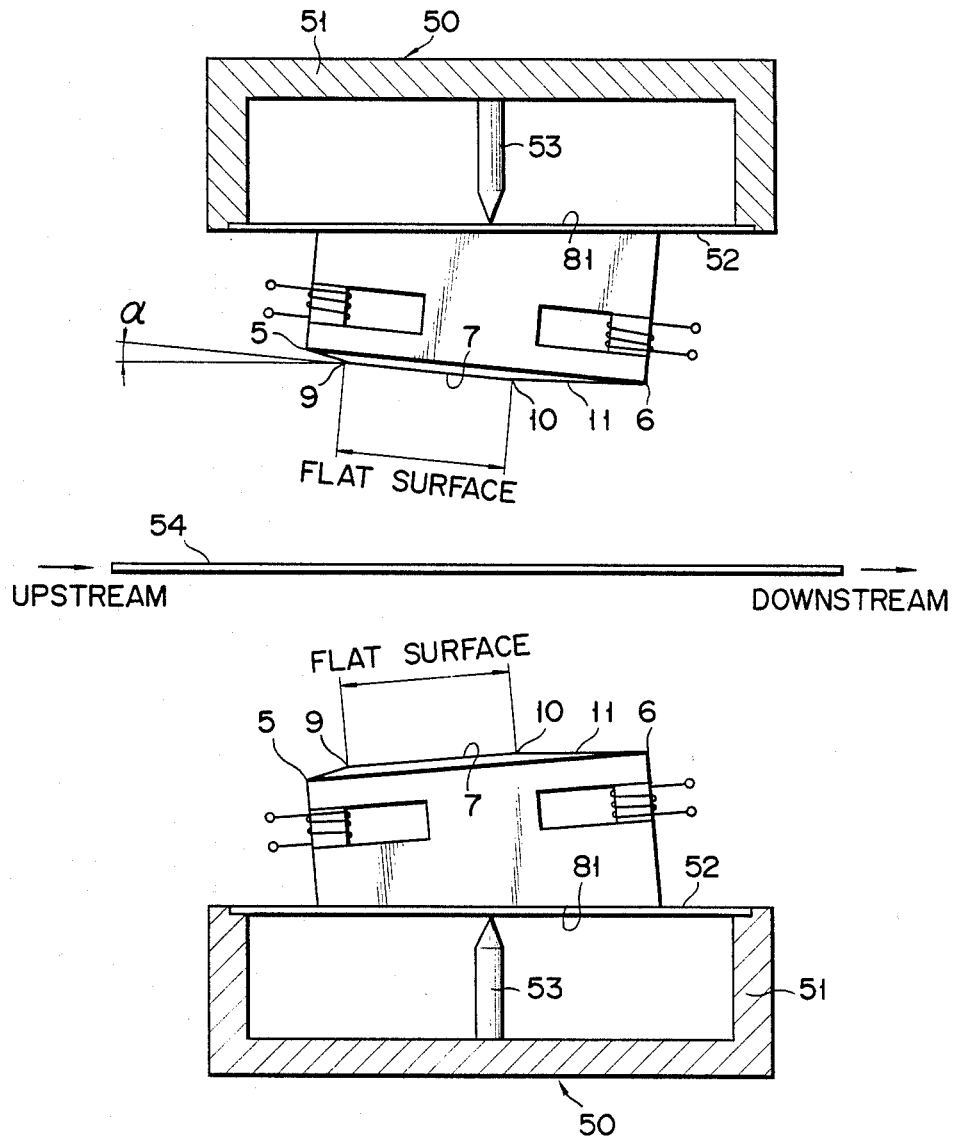
F I G. 14

MAGNETIC HEAD APPARATUS HAVING SURFACES CONTOURED TO MINIMIZE FRICTION BETWEEN A MAGNETIC HEAD AND A MAGNETIC DISK

BACKGROUND OF THE INVENTION

The present invention relates to a magnetic head which can contact a flexible magnetic disk and can record data on the disk and reproduce it from the disk.

Magnetic disks can be classified into two types, i.e., single-sided disks and double-sided disks. Data can be recorded on one surface of a single-sided disk, and on both surfaces of a double-sided disk. A magnetic head device for recording data on double-sided disks and reproducing it from the disk has the structure shown in FIGS. 4 and 5. The device has two magnetic heads 60 positioned one above the other, such that magnetic disk 62 is placed between these heads.

Each magnetic head 60 has two magnetic gaps 63 (i.e., a read/write gap and an erase gap) and a flat surface 61 facing magnetic disk 62. Gaps 63 are formed in this flat surface and located at the middle portion of the flat surface. Head 60 is supported by a support mechanism such that its flat surface is pressed onto magnetic disk 62. This mechanism comprises a gimbal spring and a pivot abutting against this spring. Magnetic head 60 is attached to the gimbal spring. The support mechanism applies a pressure to head 60, thus keeping the flat surface of head 60 pressed on magnetic disk 62. The mechanism allows head 60 to rotate around the radius of disk 62 and also around the line tangent to the circumference of disk 62.

The entire flat surface of magnetic head 60 is kept in contact with magnetic disk 62 by the pressure exerted on head 60 by supporting mechanism. For this reason, gaps 63 are located sufficiently close to disk 62 to record data on disk 62 or reproduce it from disk 62. For the same reason, however, there is a possibility that magnetic disk 62 is worn due to the friction between disk 62 and the flat surface. Thus, the durability of disk 60 is much impaired.

When magnetic disk 62 is rotated at high speed, it generates a great air bearing force, which causes head 60 to float above disk 62. Consequently, gaps 63 are positioned too far from disk 60, and head 60 inevitably fails to record or reproduce data correctly.

When disk 60 is vertically magnetized so that data is recorded on it in high density, it is important that gaps 63 are located sufficiently close to disk 60. In other words, it is desirable that gaps 63 be positioned close to disk 60 and also that the friction between disk 62 and the flat surface of head 60 be reduced as much as possible, thereby to prolong the lifetime of magnetic disk 60.

SUMMARY OF THE INVENTION

Accordingly, the object of the present invention is to provide a magnetic head, in which the gaps are located sufficiently close to the disk to record data on the disk or reproduce it from the disk, and the friction between the flat surface and the disk is small, thus prolonging the lifetime of the magnetic disk.

According to the present invention, there is provided a magnetic head for recording and reproducing data, on and from a flexible magnetic disk, and supported by a support mechanism which has a first axis extending in a radial direction of the disk and passing through a rotating center of the head, which is capable of rotating the head around the first axis, and which applies a pressing force to the head, air flowing in a circumferential direction of the disk, when the disk is rotated, the magnetic head comprising:

a leading edge located upstream of the air flow;

a trailing edge located downstream of the air flow;

a flat surface opposing to the disk, and having a leading end and a trailing end respectively located upstream and downstream of the air flow, a distance between the trailing edge and the disk being longer than a distance between the trailing end of the flat surface and the disk, the flat surface having a midpoint between the leading and trailing ends thereof;

a second surface opposing to the disk and connecting between the trailing edge and the trailing end of the flat surface; and magnetic gaps arranged on that portion of the flat surface which is located between the midpoint and the trailing end thereof.

Hence, the magnetic head is rotated around the first axis by virtue of an air bearing force when the support mechanism applies a force to the head. More specifically, the head is rotated such that the leading end of the flat surface is moved away from the magnetic disk, whereas the trailing end thereof is pressed onto the disk, thereby keeping that portion of the flat surface, in which the gaps are formed, in contact with the magnetic disk. Thus, the pressing force acts in only the vicinity of the trailing end of the flat surface. That is, the trailing end of the flat surface is held in a stable contact with the magnetic disk, whereas the leading end of the flat surface does not contact the magnetic disk. The friction between the flat surface of the head and the magnetic disk is, therefore, small. Hence, the magnetic head of this invention can accurately record data on the magnetic disk and can correctly reproduce data from the magnetic disk, and also can serve to prolong the lifetime of the magnetic disk.

The second surface, which extends from the trailing end of the flat surface to the trailing edge of the head, plays an important role in reducing the friction between the head and the disk and improving the data-recording and data-reproducing. The conventional magnetic head can be modified to reduce the friction between it and a magnetic disk, by cutting gaps 63 in that portion of surface 61 which is located near the trailing edge, as is illustrated in FIG. 7A. When the head is thus modified, its leading edge is moved away from disk 62, whereas its trailing edge is pressed onto disk 62, thus reducing the friction between it and disk 62. However, it is difficult to form gaps 63 close to the trailing edge, as will be described later in detail. In the present invention, the trailing end of the flat surface is positioned upstream of the trailing edge of the head, at a distance equal to the length of the second surface. And the gaps are cut in that portion of the flat surface which is close to the trailing end of the first flat surface. The gaps, can, therefore, be located substantially halfway between the leading and trailing edges of the magnetic head; they need not be positioned in the vicinity of the trailing edge of the head. Hence, the magnetic head according to the present invention can be manufactured easily, and can yet correctly record and reproduce data, on and from magnetic disk, and can also help to prolong the lifetime of the magnetic disks.

According to the present invention, there is provided another magnetic head for recording and reproducing data, on and from a flexible magnetic disk, supported by a support mechanism which has a first axis extending in a radial direction of the disk and passing through a rotating center of the head, which is capable of rotating the head around the first axis, and which applies a pressing force to the head, air flowing in a circumferential direction of the disk, when the disk is rotated, the magnetic head comprising:

a leading edge located upstream of the air flow;

a trailing edge located downstream of the air flow;

a flat surface opposing to the disk, and having a leading end and a trailing end respectively located upstream and downstream of the air flow, the flat surface having a midpoint between the leading and trailing ends thereof;

magnetic gaps arranged on that portion of the flat surface which is located between the midpoint and the trailing end thereof, whereby, when the disk is rotated at a predetermined speed and the support mechanism applies a predetermined pressing force to the head, an air bearing force is generated and acts on said flat surface, and the head is slightly rotated around the first axis such that the leading end moves away from the disk and the trailing end is pressed onto the disk, so that the portion of the flat surface can contact the disk and the magnetic gaps are located sufficiently close to the disk; and rotation-promoting means for promoting the rotation of the magnetic head caused by the air bearing force.

In the first magnetic head according to the invention, not only the leading end of the flat surface, but also the trailing end thereof moves away from the magnetic disk when the speed of rotation of the disk rises above the predetermined value, or when the force which the support mechanism applies to the head is insufficient. Consequently, that portion of the head, in which the gaps are formed, fails to contact the disk, and the electromagnetic conversion characteristic of the head is deteriorated. The second magnetic head of the invention is free of this problem. Whenever an air bearing force is exerted on the disk, the rotation of the head is promoted, whereby the leading end of the flat surface moves away from the magnetic disk, whereas the trailing end thereof contacts the disk. The trailing end of the flat surfaCe can, therefore, be prevented from leaving the magnetic disk even if the speed of the disk increases, or even if the force pressing the head onto the magnetic disk slightly changes. Since the leading end of the flat surface is spaced apart from the disk, and the trailing end is held in stable contact with the disk, the friction between the head and the disk is small, thus prolonging the lifetime of the magnetic disk, and the magnetic head can correctly record and reproduce data, on and from the magnetic disk.

BRIEF DESCRIPTION OF THE DRAWINGS

FIG. 14 is a diagram explaining the operation of a device comprising two magnetic heads, each being a third embodiment of the present invention;

DETAILED DESCRIPTION OF THE PREFERRED EMBODIMENTS

Figure 1:
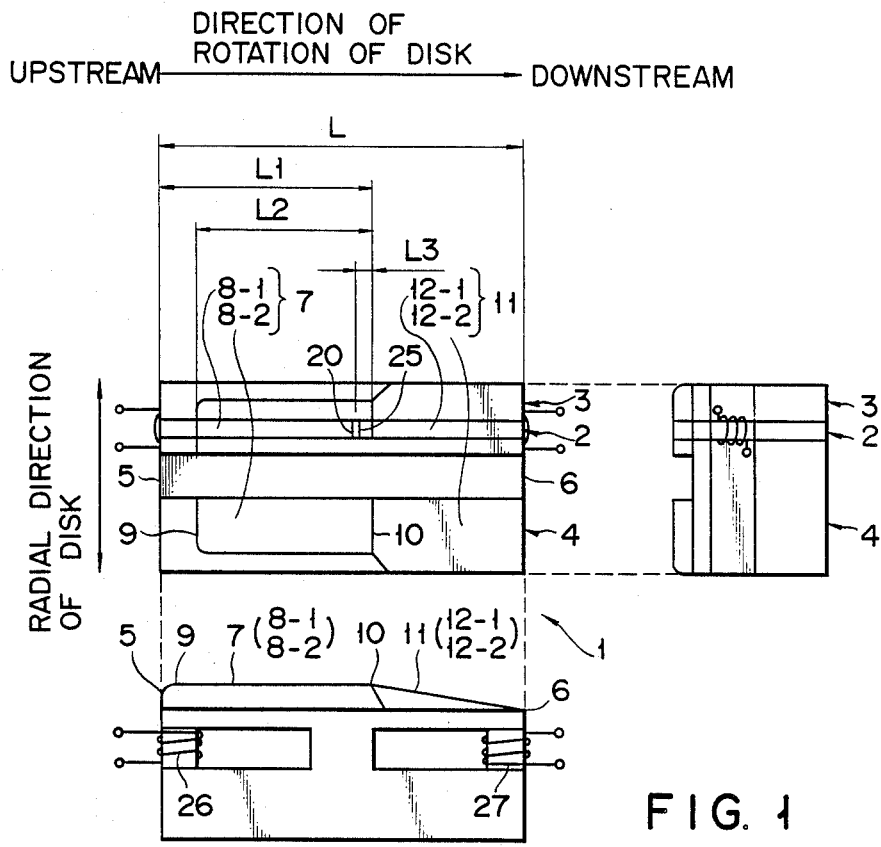
FIG. 1 shows a plan view, a flat view and a side view of a magnetic head according to a first embodiment of the present invention.
Figure 2:
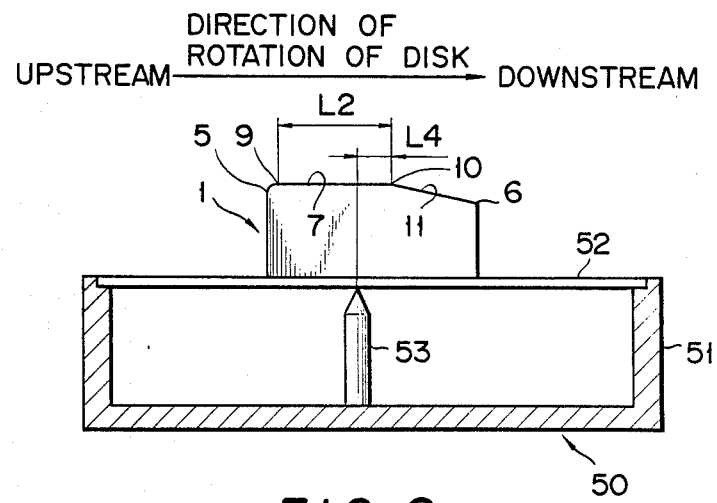
FIG. 2 is a sectional view showing a support mechanism supporting the magnetic head of FIG. 1.
Figure 3:
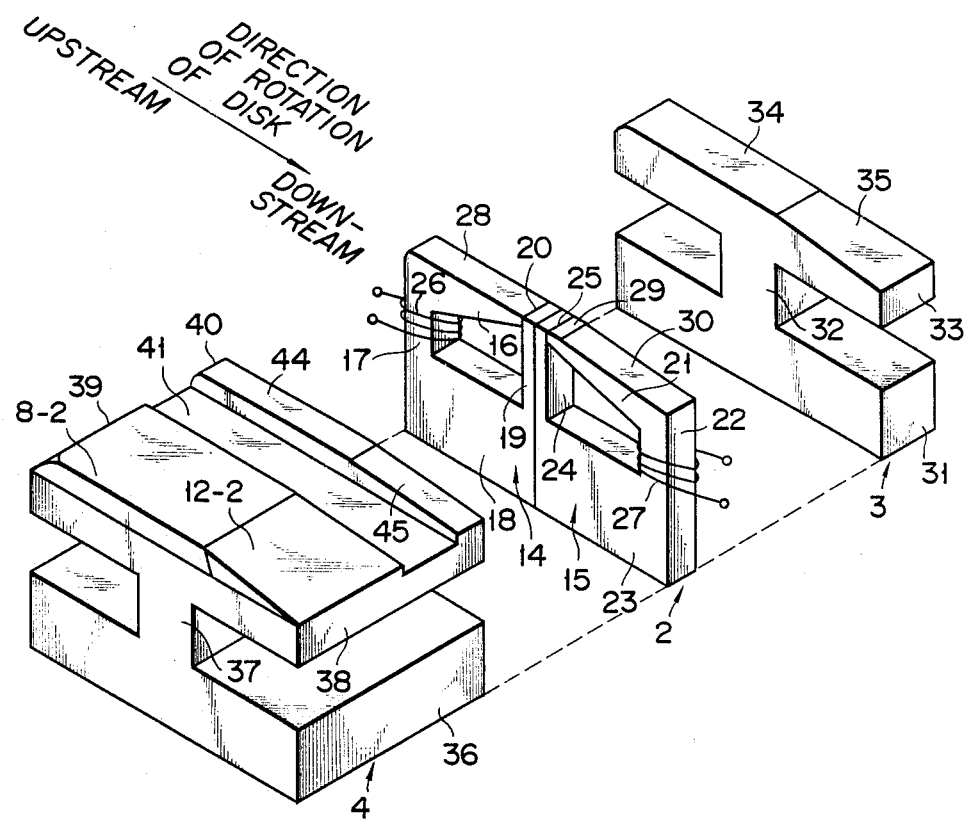
FIG. 3 is an exploded view of the magnetic head of FIG. 1.

FIGS. 1 to 3 show magnetic head 1 according to a first embodiment of the present invention. Head 1 faces a magnetic disk (not shown) during use. As the magnetic disk rotates, air flows in the circumferential direction of the disk. Upstream of air flow is defined as "leading" and downstream thereof is defined as "trailing".

Magnetic head 1 comprises magnetic core 2 and two sliders 3 and 4, one located at each side of core 2. Head 1 is designed for use in a magnetic disk device for recording data on double-sided magnetic disks, and reproducing data from the disks. In actual use, two magnetic heads identical to this head 1 are combined, and positioned above and below a magnetic disk, respectively.

As is shown in FIG. 1, magnetic head 1 has leading edge 5 and trailing edge 6 respectively located upstream and downstream with respect to the direction in which a magnetic disk is rotated. Head 1 has flat surface 7 and inclined surface (or second surface) 11. Flat surface 7 has leading end 9 and trailing end 10. Inclined surface 11 extends between trailing end 10 of surface 7 and trailing edge 6 of head 1. Hence, the surface consisting of these surfaces 7 and 11 extends between leading edge 5 and trailing edge 6. Surface 7 opposes the magnetic disk. Flat surface 7 consists of first section 8-1 and second section 8-2. Inclined surface 11 consists of first section 12-1 and second section 12-2. The distance between trailing edge 6 and the magnetic disk is longer than the distance between trailing end 10 of surface 7 and the disk. Leading edge 5 is tapered so that air can easily flow into the gap between magnetic head 1 and the magnetic disk (not shown).

As is shown in FIG. 3, magnetic core 2 comprises read/write core 14 (i.e., the first core) and an erase core 15 (i.e., the second core). Erase core 15 is connected to core 14, and located downstream of core 14 with respect to the direction in which the magnetic disk is rotated. Read/write core 14 has a trapezoidal through hole, and is formed of four portions 16, 17, 18, and 19; it has read/write gap 20 between first portion 16 and fourth portion 19. Erase core 15 has an identical trapezoidal through hole, and is formed of four portions 21, 22, 23, and 24; it has erase gap 25 between first portion 21 and fourth portion 24. Coil 26 is wound around second portion 17 of read/write core 14. Similarly, coil 27 is wound around second portion 22 of erase core 15. First portion 16 of read/write core 14 has first flat surface segment 28. First portion 21 of erase core 15 has second flat surface segment 29 continuous to surface segment 28 of core 14, and second inclined surface segment 30 to second surface segment 29.

As is illustrated in FIG. 3, slider 3 comprises base 31, support 32, and member 33. Base 31 is attached to a support mechanism (not shown, and later described). Support 32 protrudes from base 31, and member 33 is connected to the upper end of support 32. Member 33 has third flat surface segment 34 and third inclined surface segment 35 to surface segment 34.

Slider 4 also comprises base 36, support 37, and member 38. Base 36 is attached to the support mechanism. Support 37 protrudes from base 36, and member 38 is coupled to the upper end of support 37. Groove 41, extending in the direction of rotation of the disk (not shown), is cut in the upper surface of member 38, thereby defining two parallel ridges 39 and 40 both extending in the direction of rotation of the magnetic disk. Ridge 39 has second sections 8-2 and 12-2. Ridge 40 has fourth flat surface segment 44 and fourth inclined surface segment 45.

Magnetic core 2 and sliders 3 and 4 are aligned in the radial direction of magnetic disk (not shown), such that first to fourth flat surface segments 28, 29, 34 and 44 are in the same plane and define first section 8-1 of flat surface 7. Second to fourth inclined surface segments 30, 35, and 45 are in the same plane and define first section 12-1 of inclined surface 11. As may be evident from FIG. 1, sections 8-1 and 8-2 of surface 7 have substantially the same area, and sections 12-1 and 12-2 of inclined surface 11 have substantially the same area.

Magnetic core 2, slider 3 and slider 4, which have horizontal surfaces and inclined surfaces, are combined together, thus forming magnetic head 1. Alternatively, core 2 and sliders 3 and 4 can be combined before forming the horizontal and inclined surfaces, in which case the core and the sliders are machined to have horizontal and inclined surfaces.

As can be understood from FIG. 1, distance $L_1$ between leading edge 5 and trailing end 10 of flat surface 7 is 0.5 to 0.75 L, where L is the distance between leading edge 5 and trailing edge 6 of magnetic head 1.

Read/write gap 20 and erase gap 25 can be located anywhere between the midpoint of flat surface 7 and trailing end 10 of surface 7. Preferably, distance $L_3$ between gaps 20 and 25, on the one hand, and trailing end 10 of flat surface 7, on the other, is equal to or less than 0.2 $L_2$, where $L_2$ is the distance between leading end 9 and trailing end 10 of flat surface 7.

As is shown in FIG. 2, magnetic head 1 is attached to support mechanism 50, which is one of the components of a magnetic disk device. Support mechanism 50 comprises carriage 51, gimbal spring 52, and pivot 53. Carriage 51 is a rectangular box having an open top. Gimbal spring 52 is a plate covering the open top of carriage 51. Spring 52 has a specific elasticity. Head 1 is mounted on this gimbal spring 52.

Pivot 53 extends from the bottom of carriage 51. Its tip is pointed and contacts gimbal spring 52. Pivot 53 applies force to spring 52, which pushes magnetic head 1 onto the magnetic disk (not shown). Magnetic head 1 can rotate by means of pivot 52 around two axes, both passing through a point (rotating center of head 1) where the tip of pivot 53 is located. The first axis extends in the radial direction of the magnetic disk, and the second axis is tangent to the circumference thereof. The tip of pivot 53 is vertically aligned with that point on flat surface 7 which is on the center line of head 1, parallel to the radius of the magnetic disk, and which is located between trailing end 10 and the midpoint of surface 7. That is, the tip of pivot 53 is positioned such that distance $L_4$ between the tip and trailing end 10 is 0 to 0.5 $L_2$, where $L_2$ is, as has been specified, is the distance between leading end 9 and trailing end 10 of flat surface 7. Preferably, $L_4 = 0.4 L_2$. In this case, magnetic head 1 can readily be rotated such that leading end 9 of flat surface 7 rises, while trailing end 10 falls.

The operation of a magnetic head device comprising two heads identical to magnetic head 1 described above will now be explained with reference to FIG. 6. Both magnetic heads 1 are pressed onto magnetic disk 54 by pivots 53. When disk 54 is rotated at a predetermined speed, air flows in the direction in which disk 54 rotates, thus generating air-bearing force. This force acts on flat surface 7 of either head 1. As a result, heads 1 are slightly rotated around the first axis such that leading end 9 rises and trailing end 10 falls. Hence, trailing end 10 is pressed onto magnetic disk 54. At this time, surface 11 is inclined, and trailing edge 6 does not contact the magnetic disk. Thus, the force acts on only that portion of surface 7 which is close to trailing end 10. Since said portion of surface 7 pressed onto disk 54 with a sufficient force, both gaps 20 and 25 are located sufficiently close to disk 54. On the other hand, that portion of surface 7, which is near leading end 10, is spaced from magnetic disk 54, and applies but a small frictional force to disk 54. Therefore, the head device can accurately record data on disk 54 and accurately reproduce it from disk 54, without wearing magnetic disk 54 to an alarming extent.

The friction between the magnetic disk and the flat surface of the conventional magnetic head will be discussed, with reference to FIGS. 4 and 5. Let us assume the middle portion of either head 60, in which gaps 63 are formed, must apply pressure $P_0$ to magnetic disk 62 in order to achieve an optimum data-recording or an optimum data-reproducing. Since that surface 61 of head 60 which contacts disk 62 is flat, entire surface 61 exerts the same pressure, $P_0$, on magnetic disk 62. In some cases, the force applied from either head 60 to disk 62 is distributed as is shown in FIG. 5; the force is decreasing from the leading end of flat surface 61 toward the trailing end thereof.

Frictional force $F_1$, which entire surface 61 exerts on magnetic disk 62, can be given:

$$F_1 = P_0 S \mu \tag{1}$$

where S is the area of flat surface 61, and $\mu$ is the coefficient of friction between surface 61 and magnetic disk 64.

Frictional force $F_2$, which magnetic head 1 (FIG. 1) of the present invention exerts on magnetic disk 54, is much smaller than frictional force $F_1$ which conventional head 60 applies to disk 62, mainly because leading end 9 of flat surface 7 is spaced apart from disk 54. More specifically, as can be understood from FIG. 6, frictional force $F_2$ is $\frac{1}{4} F_1$ when only the downstream half of flat surface 7 contacts disk 54, upstream half of surface 7 is spaced apart from disk 54, magnetic gaps 20 and 25 are formed at trailing end 10 of surface 7, and optimum pressure $P_0$ is applied to disk 54 from trailing end 10 of surface 7. That is:

$$F_2 = (\tfrac{1}{4}) P_0 S \mu \tag{2}$$

The larger the upstream portion of surface 7 which is spaced apart from disk 54, the smaller the frictional force ($F_2$). Optimum pressure $P_0$ is always applied to disk 54 from that portion of surface 7 in which both gaps 20 and 25 are formed.

Figure 4:
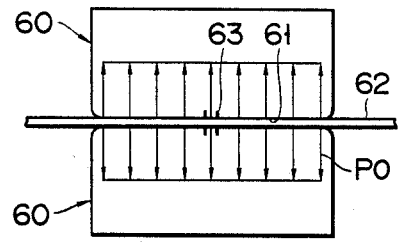
FIGS. 4 and 5 are diagrams schematically showing devices each comprising two conventional magnetic heads.
Figure 5:
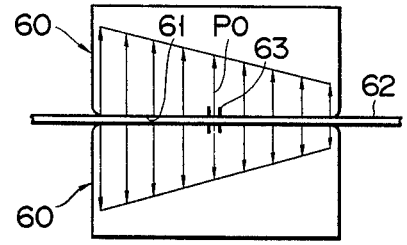
Figure 7A:
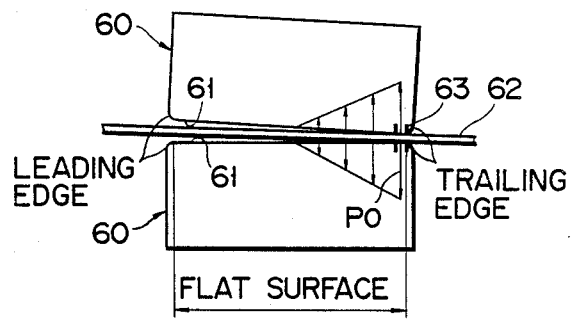
FIG. 7A is a diagram explaining the operation of a device comprising two magnetic heads of the known type.
Figure 7:
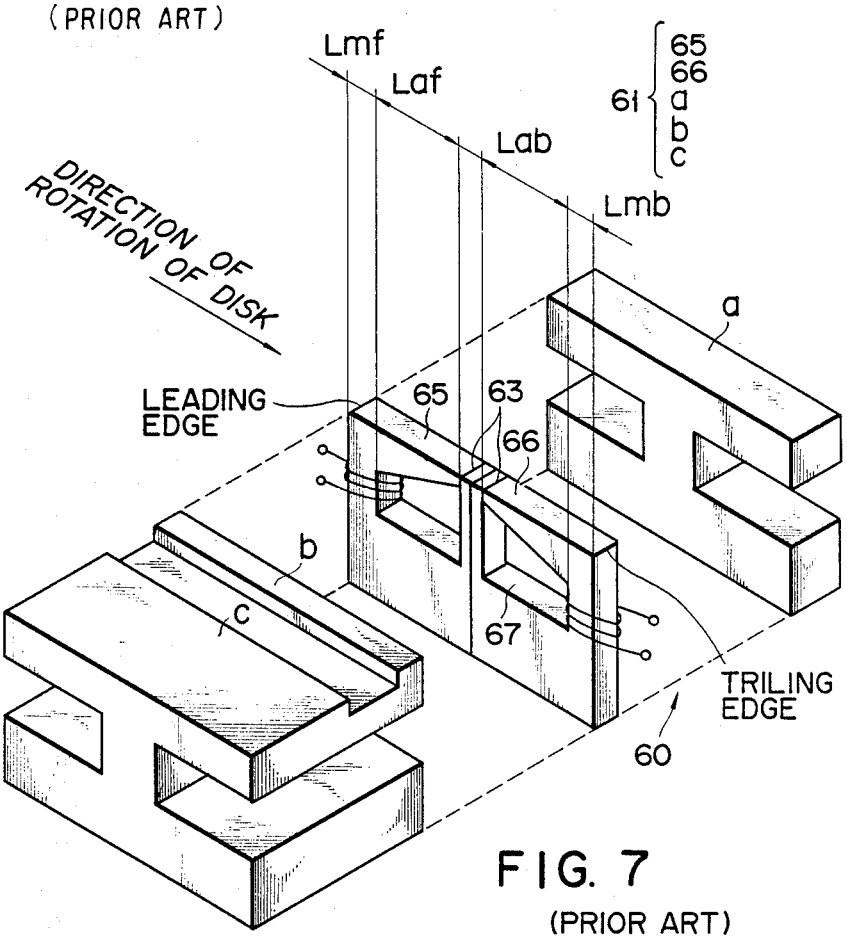
FIG. 7 is an exploded view of the conventional magnetic head.

FIG. 7 is an exploded view of conventional magnetic head 60 (FIGS. 4 and 5). As is shown in this figure, gaps 63 are located substantially halfway between the leading and trailing edges of flat surface 61 of head 60. Hence, that portion of surface 61 in which gaps 63 are formed does not contact magnetic disk 62 when the leading edge of surface 61 is spaced apart from disk 62, while the trailing edge is pressed onto disk 62. Two methods are available for making said portion of surface 61 contact disk 62.

The first method is to increase distance Laf (FIG. 7). In this case, flat upper surface segment 65 of the read/write core is longer than flat upper surface segment 66 of the erase core. As a result, gaps 63 are located close to the trailing edge of surface 61 than to the leading edge thereof. However, the area of surface 61 increases, and even if the leading edge of surface 61 is spaced apart from disk 62, the friction between surface 61 and disk 62 does not decrease, though that portion of surface 61 in which gaps 63 are formed can contact magnetic disk 62.

The second method of making said portion of surface 61 contact disk 62 is to position gaps 63 near the trailing edge of flat surface 61, as is illustrated in FIG. 7A. In this case, that portion of surface 61 in which gaps 63 are formed contacts magnetic disk 62. More precisely, the second method is to reduce distance Lab and distance Lmb, both being shown in FIG. 7. This method, however, results in a problem. That is, through hole 67 of the erase core will be too small to wound surface 11 toward magnetic disk 54. As a result, the angular moment for rotating head 1 increases. The leading end of flat surface 7 is liable to move away from magnetic disk 54, and the trailing end of surface 7 is liable to be pressed onto disk 54. In other words, the negative pressure promotes the rotation of head 1, in a specific direction. Further, the negative pressure prevents trailing end 10 from leaving disk 54 even if the air bearing force acting on surface 7 increases a little. Hence, that portion of surface 7, in which both gaps 20 and 25 are formed, can stably contact magnetic disk 54.

The inventors hereof have conducted experiments on a device comprising two magnetic heads identical with the conventional one shown in FIGS. 4 and 5, and also on a device comprising two magnetic heads identical to the embodiment of FIG. 1. In the experiments, various loads were exerted on the heads of either device, and the force of friction between a magnetic disk and the flat surface of either head of each device was measured. In the experiments, the output power of each device was also measured. The results were as is shown in the graph of FIG. 8.

Figure 8:
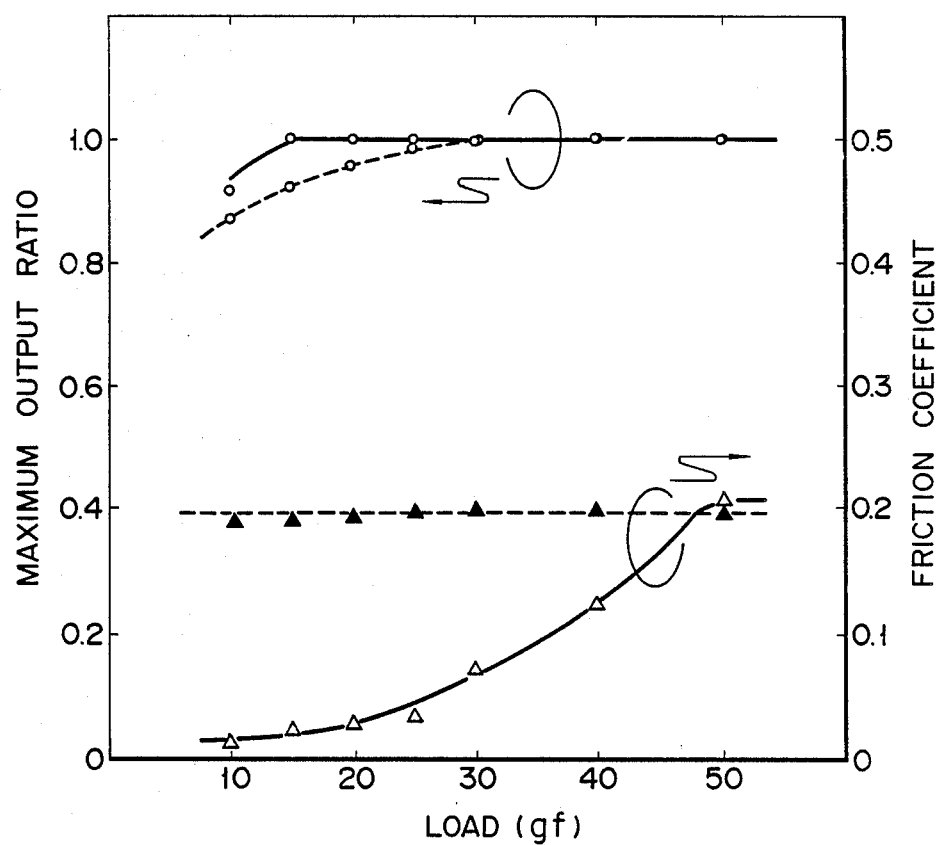
FIG. 8 is a graph representing the operation efficiency of the device shown in FIG. 7 and that of the device comprising two magnetic heads of this invention (FIG. 1)

In FIG. 8, mark o represents the maximum output ratio, obtained by the magnetic head according to the first embodiment of the invention, and mark △ indicates the coefficient of friction between this magnetic head a wire, with ease, around the vertical portion of the erase core, thereby to form a coil. In case distance Lmb is small, the erase core is likely to be broken. After all, it would be advisable not to position gaps 63 near the trailing edge of flat horizontal surface 61.

In contrast, magnetic head 1 (FIG. 1) of the present invention has inclined surface 11 continuous to trailing end 10 of flat surface 7. Therefore, trailing end 10 is located upstream at a distance from trailing edge 6 of head 1, said distance being equal to the length of inclined surface 11. Hence, gaps 20 and 25 are located in the vicinity of trailing end 10 of flat surface 7. In other words, gaps 20 and 25 need not be positioned near trailing edge 6 in order to cause that portion of surface 7, in which gaps 20 and 25 are formed, to contact disk 54. In addition, since flat surface 7 is relatively small, the force of friction between this surface 7 and magnetic disk 54 is less than the force of friction between flat surface 61 of conventional head 60 and magnetic disk 62. Therefore, magnetic head 1 of this invention does not exerts an excessive force on magnetic disk 54 and can correctly record data on disk 54 and reproduce the data therefrom.

Further, when leading end 9 of flat surface 7 is spaced apart from magnetic disk 54, a negative pressure is built up on inclined surface 11, thus attracting and the magnetic disk. Also in FIG. 8, mark ● shows the maximum output ratio obtained by the conventional magnetic head, and mark ▲ represents the coefficient of friction between the conventional head and the magnetic disk. The term "maximum output ratio" means the ratio of the output value which the head produces when a certain load was applied, thus pressing the head onto the magnetic disk, to the maximum output value the head could produce, when that portion of the head, in which the gaps are formed, contacts the magnetic disk in an optimum condition. Hence, the maximum output ratio should be 1 when said portion of the magnetic head contacts the disk in the best possible condition. The maximum output ratio became large as the load was increased, for both conventional head and the head of the present invention.

As is shown in FIG. 8, in the conventional magnetic head, the coefficient of friction was almost unchanged, about 0.2, independent of the load applied on the head. In contrast, in the head according to the first embodiment of this invention, the coefficient of friction was 0.05 or less in the small-load region, and increases gradually as the load was increased. When the load was 50 gf or greater, the friction coefficient was substantially the same for both the conventional head and the head of the present invention. In the magnetic head of this invention, the friction coefficient was rather small, 0.03 which is about 1/7 of that for the conventional head, and the maximum output ratio was, nonetheless, 1, when the load of 20 gf was exerted on the magnetic head. That is, in the first embodiment of the present invention, the portion having the gaps was pressed onto the disk with a desired force, while the friction between it and the disk was reduced to an extremity small value.

Figure 9:
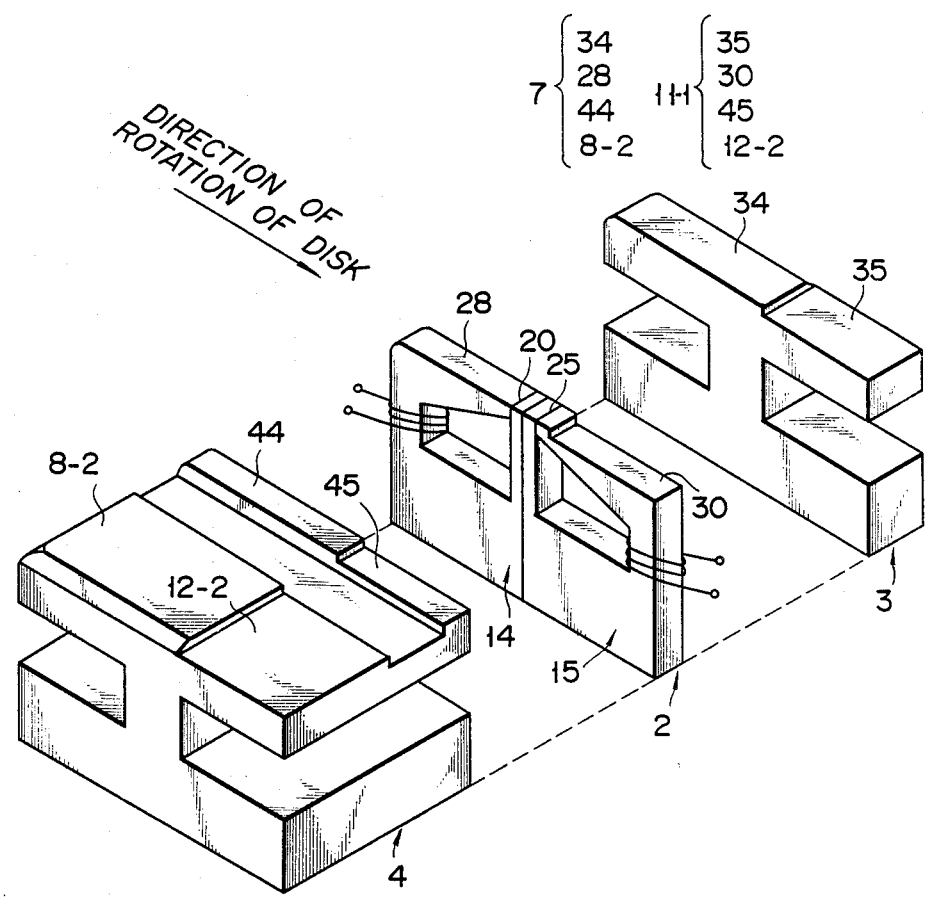
FIG. 9 is an exploded view showing a modification of the magnetic head shown in FIG. 1.

FIG. 9 is an exploded view of a modification of the first embodiment of the invention. In this modification, flat surface 11-1 is provided, instead of inclined surface 11. This flat surface 11-1 is continuous to the trailing end of flat surface 7, and is at a level slightly lower than horizontal surface 7. The modification is identical, in structure, to the first embodiment (FIG. 3) in all other respects. Hence, the modification of FIG. 9 can attain the same advantage as the first embodiment.

A second embodiment of the present invention will now be described with reference to FIGS. 10 and 11.

Figure 10:
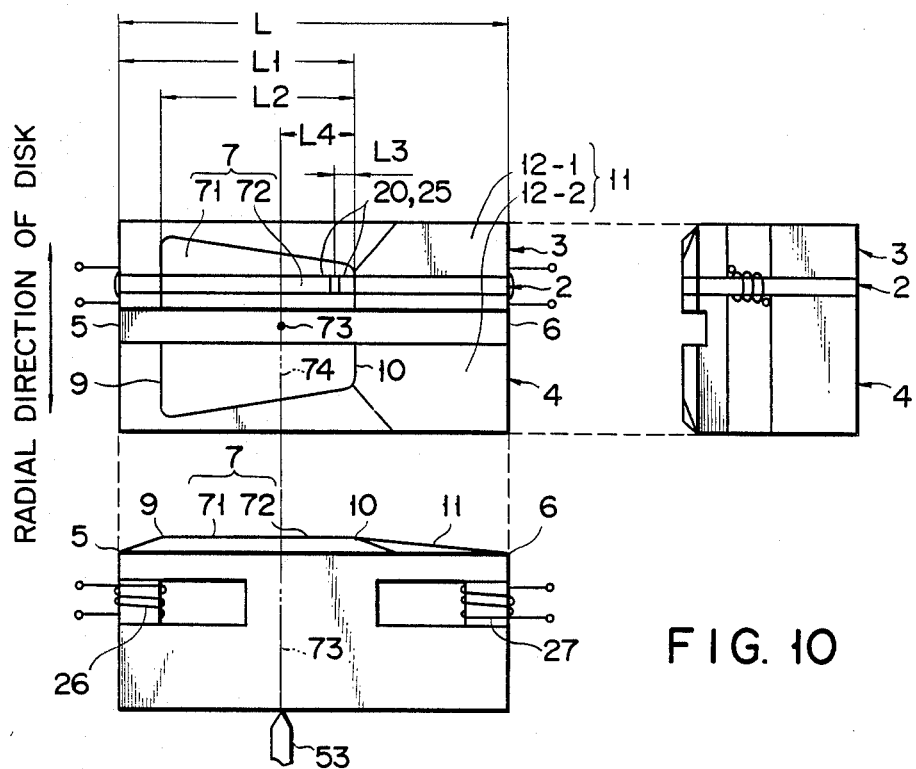
FIG. 10 shows a plan view, a front view and a side view of a magnetic head according to a second embodiment of the present invention.
Figure 11:
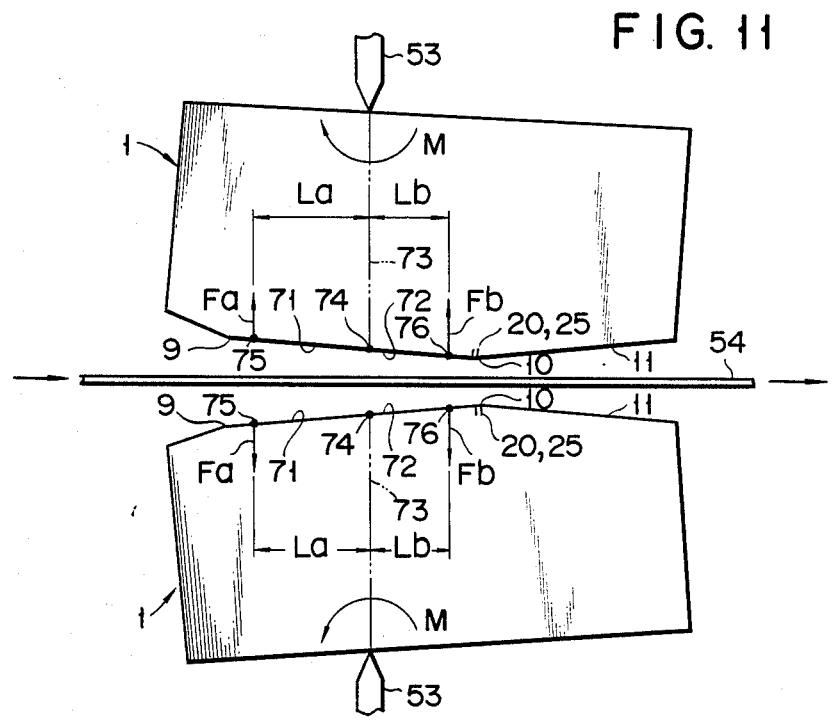
FIG. 11 is a front view explaining the operation of a device comprising two magnetic heads of the type shown in FIG. 10.

As is illustrated in FIGS. 10 and 11, the magnetic head according to the second embodiment is supported by pivot 53. Pivot 53 applies a pressure to magnetic head 1 along line 73 (hereinafter referred to as "action line"). In the second embodiment, flat surface 7 consists of upstream section 71 and downstream section 72. Upstream section 71 is located between leading end 9 of surface 7 and imaginary line 74 extending in surface 7 in the radial direction of magnetic disk 54, and crossing action line 73 at right angles. Downstream section 72 is located between trailing end 10 of surface 7 and line 74. Upstream section 71 is larger than downstream section 72. This is because flat surface 7 is trapezoidal, and its width gradually decreases from leading end 9 toward trailing end 10 as is shown in FIG. 10. The positional relationship among surface 7, gaps 20 and 25, and pivot 53 is exactly the same as in the first embodiment (FIGS. 3 and 6).

The operation of a magnetic head device comprising two heads identical to the head of the second embodiment (FIG. 10) will be explained with reference to FIGS. 6 and 11.

Figure 6:
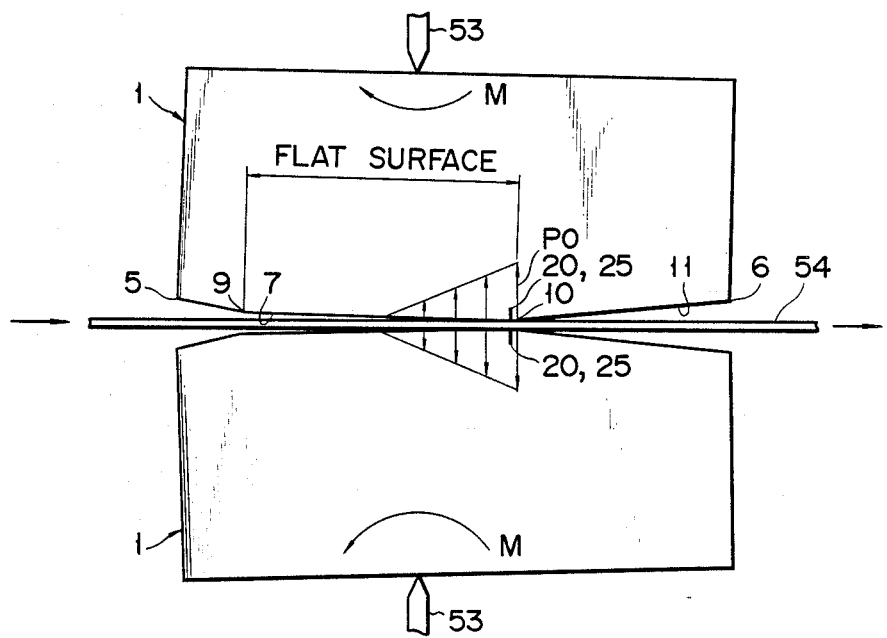
FIG. 6 is a diagram explaining the operation of a device comprising two magnetic heads of the type shown in FIG. 1.

When magnetic disk 54 is rotated at a predetermined speed, and pivot 53 applies a predetermined pressure to either head 1, as is shown in FIG. 6, leading end 9 of surface 7 is spaced away from disk 54, and trailing end 10 thereof is pressed onto magnetic disk 54. When the speed of disk 54 rises, or the pressure applied to head 1 decreases as is shown in FIG. 11, trailing end 10 is also spaced away from magnetic disk 54. Consequently, that portion of surface 7 in which gaps 20 and 25 are formed cannot stably contact magnetic disk 54. The electromagnetic conversion characteristic of the head is inevitably deteriorated. Hence, some measures are taken in the second embodiment in order to prevent said portion of surface 7 from leaving magnetic disk 54 even if the speed of disk 54 changes slightly. More specifically, as has been pointed out, upstream section 71 is larger than downstream section 72. This design feature serves to keep that portion of surface 7 in contact with disk 54 even if the speed of rotation of disk 54 undergoes slight changes, as will be understood from the following explanation.

As is evident from FIG. 11, an air bearing pressure is applied on flat surface 7 of either head 1 when magnetic disk 54 is rotated. Angular moment M at the tip of pivot 53 is given as follows:

$$M = (Fa \times La) - (Fb \times Lb) \qquad (3)$$

where Fa is the total air-bearing force applied on upstream section 71, La is the distance between line 74 and pressure center 75 at which force Fa is concentrated, Fb is the total air-bearing force exerted on downstream section 72, and Lb is the distance between line 74 and pressure center 76 at which force Fb is concentrated.

No angular moment is generated at the tip of pivot 53 when:

$$M = (Fa \times La) - (Fb \times Lb) = 0 \qquad (4)$$

If this is the case, not only upstream section 71, but also downstream section 72 is spaced away from magnetic disk 54.

An angular moment, which moves upstream section 71 away from disk 54 and pushes downstream section 72 onto disk 54, is generated at the tip of pivot 53 when:

$$M = (Fa \times La) - (Fb \times Lb) > 0 \qquad (5)$$

Since upstream section 71 has a greater area than downstream section 72, the angular moment exerted on upstream section 71 is liable to be greater than that applied to downstream section 72. Therefore, $(Fa \times La)$ is likely to be greater than $(Fb \times Lb)$, and equation (5) can thus be satisfied. Leading end 9 of surface 7 is liable to move away from disk 54, whereas trailing end 10 of surface 7 is liable to firmly contact disk 54. In other words, the magnetic head of the second embodiment can more easily pivoted in a specific direction than in any other direction. Hence, trailing end 10 of surface 7 is held in contact with magnetic disk 54 even if the air-bearing force acting on surface 7 slightly changes. The gaps (20 and 25), both located near trailing end 10, is therefore located sufficiently close to disk 54, and the friction between head 1 and disk 54 is small, whereby the lifetime of disk 54 can be lengthened.

The magnetic head according to the second embodiment can also attain the same advantage as is demonstrated by graph of FIG. 8.

Two modifications of the second embodiment will be briefly described with reference to FIGS. 12 and 13.

Figure 12:
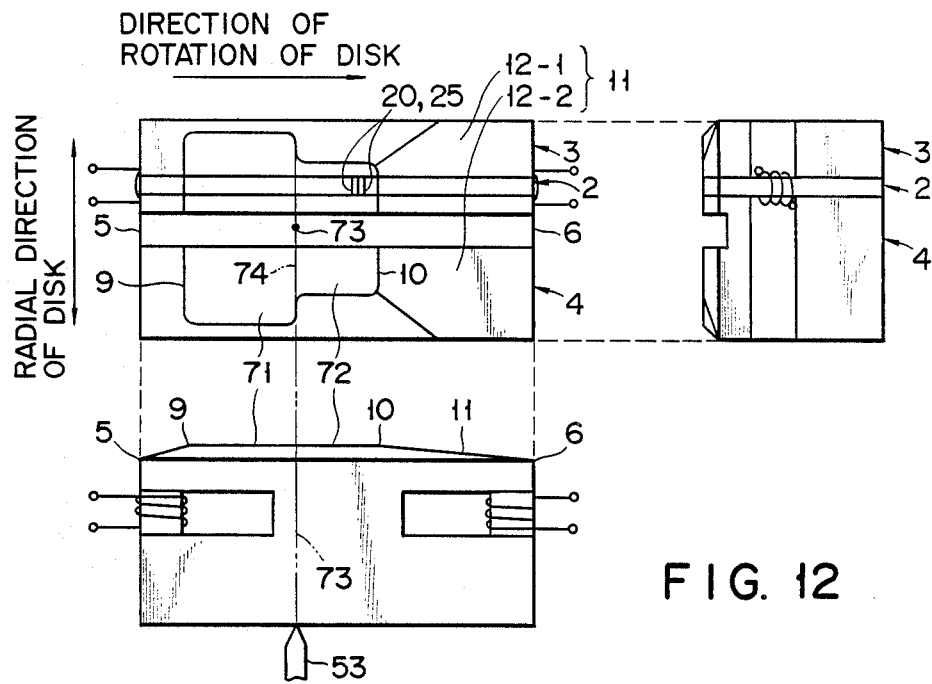
FIG. 12 shows a plan view, a front view and a side view of a magnetic head according to a modification of the second embodiment of the present invention.

In the modification shown in FIG. 12, upstream section 71 is rectangular, and downstream 72 is also rectangular and smaller than upstream section 71. Leading end 9 of flat surface 7 is thus likely to move away from magnetic disk 54, whereas trailing end 10 of surface 7 is liable to be pressed onto magnetic disk 54, when magnetic disk 54 is rotated.

Figure 13:
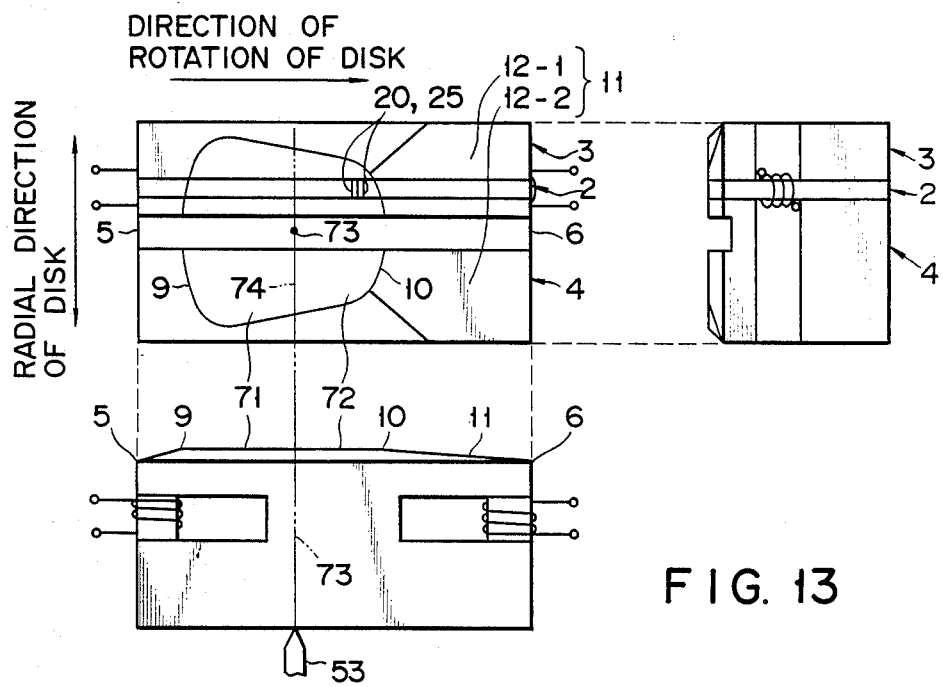
FIG. 13 shows a plan view, a front view and a side view of another modification of the second embodiment.

In the modification of FIG. 13, surface 7 is generally trapezoidal, and both leading end 9 and trailing end 10 are arcuate. Upstream section 71 is larger than downstream section 72 since the width of surface 7 gradually decreases from leading end 9 toward trailing end 10. Hence, also in this modification, when magnetic disk 54 is rotated, leading end 9 is likely to move away from magnetic disk 54, whereas trailing end 10 is liable to be pressed onto disk 54.

Figure 15:
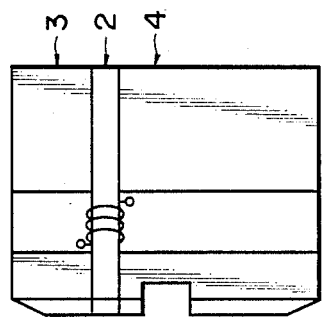
FIG. 15 shows a plan view, a front view and a side view of the magnetic heads of the device shown in FIG. 14.
Figure 15:
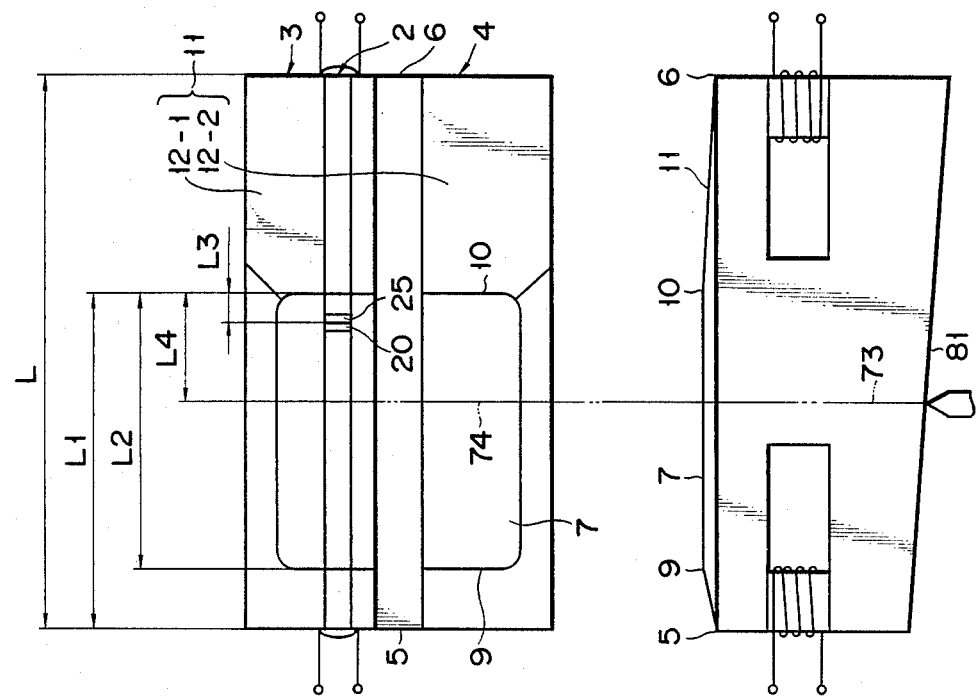

A third embodiment of the present invention will now be described with reference to FIGS. 14 and 15.

As is shown in FIG. 14, the magnetic head is attached to gimbal spring 52, with flat surface 7 inclined to magnetic disk 54. Surface 7 is inclined to disk 54 such that, when magnetic disk 54 is not rotated, the gap between disk 54 and leading end 9 of surface 7 is broader than the gap between disk 54 and trailing end 10 of surface 7. When magnetic head is pressed onto disk 54, gimbal spring 52 is deformed, thus making it easy to generate angular moment $M_G$ at the tip of pivot 53, which causes leading end 10 to move away from disk 54 and trailing end 10 to contact magnetic disk 54. The surface 81 of the magnetic head which is attached to gimbal spring 52, is inclined to flat surface 7. Angle α at which surface 7 is inclined to magnetic disk 54 is preferably 0° to 10°. Further, as is shown in FIG. 15, gaps 20 and 25, flat surface 7 and pivot 53 have the same positional relationship as in the first embodiment.

The operation of the third embodiment (FIGS. 14 and 15) will now be explained with reference to FIGS. 6 and 11. In the third embodiment, too, that portion of flat surface 7, in which gaps 20 and 25 are formed, is prevented from leaving magnetic disk 54, as will be apparent from the following explanation.

Angular moment M generated at the tip of pivot 53 can be represented as follows:

$$M = (F_a \times L_a) + M_G - (F_b \times L_b) \quad (6)$$

where $M_G$ is the angular moment produced when gimbal spring 52 is deformed.

As is shown in FIG. 11, not only leading end 9 of surface 7, but also trailing end 10 moves away from disk 54 when:

$$M = (F_a \times L_a) + M_G - (F_b \times L_b) = 0 \quad (7)$$

Trailing end 10 of flat surface 7 contacts when:

$$M = (F_a \times L_a) + M_G - (F_b \times L_b) > 0 \quad (8)$$

As has been described, flat surface 7 is inclined to magnetic disk 54 in the third embodiment. Therefore, gimbal spring 52 is deformed very much when surface 7 is pressed onto disk 54. Angular moment $M_G$ created by gimbal spring 52 is greater than in the case where surface 7 is parallel to magnetic disk 54. Angular moment M is, therefore, liable to have a positive value. That is, equation (8) is more likely to hold. Thus, the leading end of flat surface 7 can more readily be spaced away from disk 54 than in the case where surface 7 is parallel to disk 54. In other words, the magnetic head can be more easily be rotated in a specific direction than in any other direction. Hence, trailing end 10 of flat surface 7 is held in contact with disk 54 even if the speed of disk 54 slightly changes, or if the air-bearing force applied to surface 7 varies a little. That portion of surface 7, which is close to trailing end 10 and in which gaps 20 and 25 are formed, remains in a stable contact with magnetic disk 54, and the friction between the head and disk 54 is small, whereby the lifetime of disk 54 can be lengthened.

The magnetic head according to the third embodiment can also attain the same advantage as is demonstrated by the graph of FIG. 8.

Two modifications of the third embodiment will be briefly described with reference to FIGS. 16 and 17.

Figure 16:
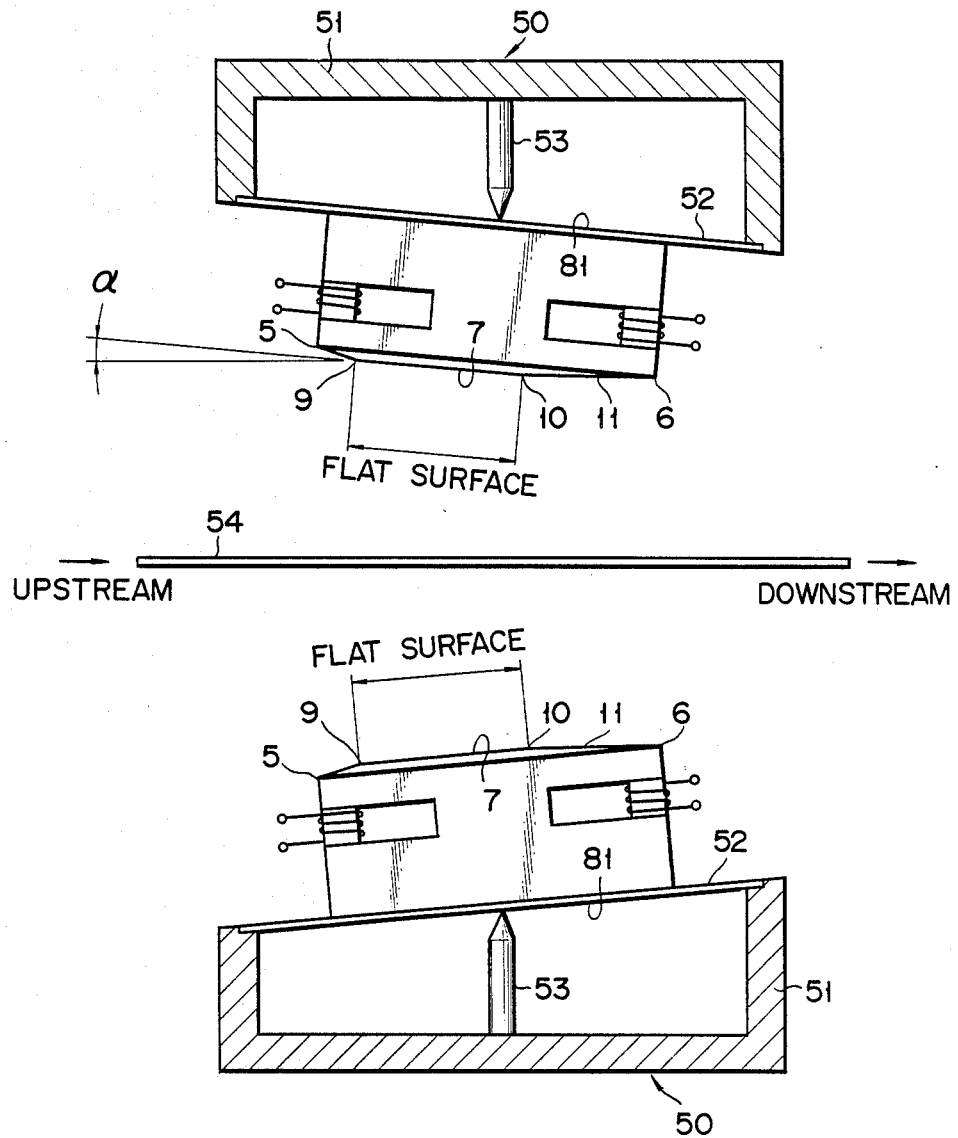
FIG. 16 is a diagram explaining the operation of a device comprising two magnetic heads, each being a further modification of the third embodiment.

In the modification of FIG. 16, gimbal spring 52 is inclined to magnetic disk 54. Therefore, gimbal spring 52 produces a specific angular moment when flat surface 7 is pushed onto magnetic disk 54. Obviously, the modification operates in the same way, and achieves the same advantage as the third embodiment.

Figure 17:
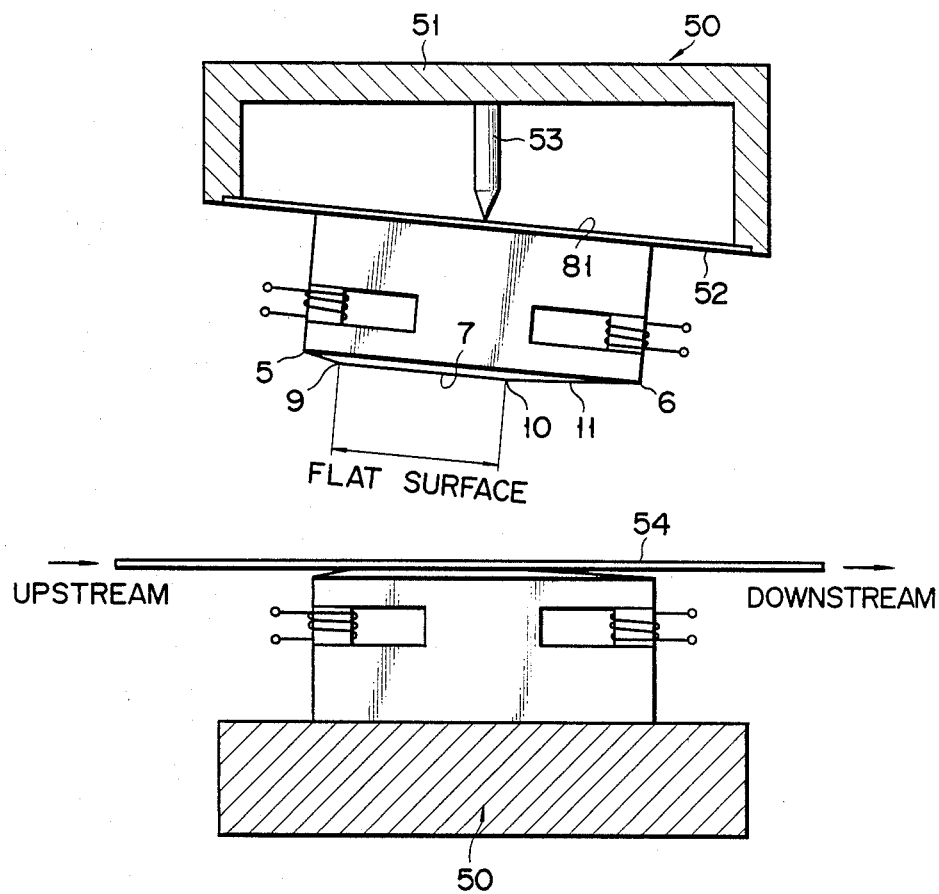
FIG. 17 is a diagram explaining the operation of a device comprising two magnetic heads, each being still another modification of the third embodiment.

In the modification shown in FIG. 17, the flat surface 7 of only one of the two magnetic heads is inclined to magnetic disk 54. According to the present invention, it is sufficient that the flat surface of at least one magnetic head is inclined to magnetic disk 54.

What is claimed is:

1. A magnetic head apparatus for recording and reproducing data, on and from a flexible magnetic disk, comprising:

a magnetic head; and a support mechanism for supporting said magnetic head, said support mechanism having a first axis extending in a radial direction of the disk and passing through a rotating center of the head, which is capable of rotating the head around the first axis, and which applies a pressing force to the head, air flowing in a circumferential direction of the disk, when the disk is rotated;

said magnetic head comprising, a leading edge located upstream of the air flow, a trailing edge located downstream of the air flow, a flat surface opposing to the disk, and having a leading end and a trailing end respectively located upstream and downstream of the air flow, a distance between said trailing edge and the disk being longer than a distance between the trailing end of said flat surface and the disk, said flat surface having a midpoint between the leading and trailing ends thereof, a second surface opposing to the disk and connecting between said trailing edge and the trailing end of said flat surface, and magnetic gaps arranged on that portion of said flat surface which is located between the midpoint and the trailing end thereof, wherein, when the disk is rotated at a predetermined speed and the support mechanism applies a predetermined pressing force to the head, an air bearing force is generated and acts on said flat surface and produces a net moment about said first axis so that said head is thereby rotated around the first axis with the leading end moving away from the disk and the trailing end being pressed onto the disk, so that said portion of said flat surface can contact the disk and said magnetic gaps are located sufficiently close to the disk.

2. A magnetic head apparatus according to claim 1, wherein $L_1 = 0.5$ to $0.75 L$, where L is the distance between said leading and trailing edges, and $L_1$ is the distance between said leading edge and the trailing end of said flat surface.

3. A magnetic head apparatus according to claim 1, wherein said second surface has a surface which is inclined to said flat surface.

4. A magnetic head apparatus according to claim 1, wherein said second surface has a surface which is at a level different from the level of said flat surface.

5. A magnetic head apparatus according to claim 1, comprising:

a pair of identical of said magnetic heads adapted to sandwich a double-sided magnetic disk therebetween.

6. A magnetic head apparatus according to claim 1, wherein the leading end of said flat surface has a tapered portion.

7. A magnetic head apparatus according to claim 1, wherein said support mechanism includes:

a gimbal spring supporting said magnetic head, said gimbal spring having a predetermined elasticity; and a pivot having a pointed tip which contacts the gimbal spring and defines said rotating center, whereby said magnetic head receives a predetermined force from the pivot and is able to rotate around the first axis passing said rotating center.

8. A magnetic head apparatus according to claim 1, wherein: $L_3 \leq 0.2 L_2$, where $L_2$ is the distance between the leading and trailing ends of said flat surface, and $L_3$ is the distance between said gaps and the trailing end of said flat surface.

9. A magnetic head apparatus according to claim 8, wherein magnetic gaps are located in a substantially central area between said leading edge and said trailing edge.

10. A magnetic head apparatus according to claim 1, wherein: $0 < L_4 \leq 0.5 L_2$ where $L_2$ is the distance between the leading and trailing ends of said flat surface, and $L_4$ is the distance between said rotating center and the trailing end of said flat surface as measured in the circumferential direction of the magnetic disk.

11. A magnetic head apparatus according to claim 10, wherein $L_4 = 0.4 L_2$.

12. A magnetic head apparatus according to claim 1, wherein said flat surface consists of a first section and a second section spaced apart from each other in the radial direction of the magnetic disk, each of said first and second sections extending between the leading and trailing ends, and said gaps are formed in the first section, and said second surface consists of a first section and a second section spaced apart from each other in the radial direction of the magnetic disk, each of said first and second sections of said second surface extending between said trailing edge and the trailing end of said flat surface.

13. A magnetic head apparatus according to claim 12, wherein said magnetic head comprises:
a first magnetic core shaped like a ring and having a first flat surface segment opposing the magnetic disk and a read/write gap which is formed in the first flat surface segment and is one of said gaps;
a second magnetic core shaped like a ring and having a second flat surface segment opposing the magnetic disk, a second inclined surface segment located downstream of the second flat surface segment and inclined to the second flat surface segment, and an erase gap which is formed in the second flat surface segment and is another of said gaps;
a first slider connected to one side of said first and second cores, and having a third flat surface segment opposing the magnetic disk and a third inclined surface segment located downstream of the third flat surface segment and inclined to the third flat surface segment; and
a second slider connected to the other side of said first and second cores, and having a fourth flat surface segment opposing the magnetic disk and a fourth inclined surface segment located downstream of the fourth flat surface segment and inclined to the fourth flat surface segment,
wherein said first to fourth flat surface segments define said first section of said flat surface, and said second to fourth inclined surface segments define said first section of said second surface.

14. A magnetic head apparatus according to claim 13, wherein said first, second and fourth flat surface segments each include first and second sections.

15. In a magnetic head apparatus for recording and reproducing data, on and from a flexible magnetic disk, including a magnetic head, and a support mechanism for supporting said magnetic head, said support mechanism having a first axis extending in a radial direction of the disk and passing through a rotating center of the head, which is capable of rotating the head around the first axis, and which applies a pressing force to the head, air flowing in a circumferential direction of the disk, when the disk is rotated, an improved magnetic head comprising:
a leading edge located upstream of the air flow,
a trailing edge located downstream of the air flow,
a flat surface opposing to the disk, and having a leading end and a trailing end respectively located upstream and downstream of the air flow, said flat surface having a midpoint between the leading and trailing ends thereof,
magnetic gaps arranged on that portion of said flat surface which is located between the midpoint and the trailing end thereof, whereby, when the disk is rotated at a predetermined speed and the support mechanism applies a predetermined pressing force to the head, an air bearing force is generated and acts on said flat surface, and a first angular moment, which causes said head to rotate around the first axis in such a direction that the leading end moves away from the disk and the trailing end is pressed onto the disk, is generated, so that said magnetic gaps are located sufficiently close to the disk; and
means for preventing a second angular moment, which would cause said head to rotate around the first axis in a direction opposite to the first angular moment-acting direction, from being generated, whereby the generation of the first annular moment is ensured;
wherein said flat surface comprises an upstream section extending between the leading end and a line extending in the radial direction of the magnetic disk and crossing, at right angles, an action line along which a pressing force is applied from said rotating center to the magnetic head, and a downstream section extending between said line and the trailing end of said flat surface, and said preventing means comprises the upstream section and the downstream section which is smaller than the upstream section, whereby an angular moment acting on the upstream section is liable to be greater than an angular moment exerted on the downstream section, when the air bearing force is applied to the flat surface.

16. A magnetic head according to claim 15, wherein $L_1 = 0.5$ to $0.75 L$, where $L$ is the distance between said leading and trailing edges, and $L_1$ is the distance between said leading edge and the trailing end of said flat surface.

17. A magnetic head according to claim 15, wherein: $L_3 \leq 0.2 L_2$, where $L_2$ is the distance between the leading and trailing ends of said flat surface, and $L_3$ is the distance between said gaps and the trailing end of said flat surface.

18. A magnetic head according to claim 15, wherein the leading end of said flat surface has a tapered portion.

19. A magnetic head according to claim 15, further comprising a second surface opposing the magnetic disk and connecting between the trailing end of said flat surface and said trailing edge, the distance between said trailing edge and the magnetic disk being longer than the distance between the magnetic disk and the trailing end of said flat surface, and wherein, said preventing means consists of said second surface, whereby negative pressure is built up on said second surface by means of air flow, so that an angular moment for rotating said magnetic head increases when said flat surface is pressed onto the disk.

20. A magnetic head according to claim 15, wherein said upstream and downstream sections are rectangular.

21. A magnetic head according to claim 15, wherein: $0 < L_4 \leq 0.5 \, L_2$ where $L_2$ is the distance between the leading and trailing ends of said flat surface, and $L_4$ is the distance between said rotating center and the trailing end of said flat surface as measured in the circumferential direction of the magnetic disk.

22. A magnetic head apparatus according to claim 21, wherein $L_4 = 0.4 \, L_2$.

23. A magnetic head according to claim 15, wherein the leading end of said flat surface is broader than the trailing end thereof, whereby the upstream section is larger than the downstream section.

24. A magnetic head according to claim 23, wherein the width of said flat surface gradually decreases from the leading end toward the trailing end.

25. A magnetic head according to claim 23, wherein the leading and trailing ends of said flat surface are arcuate.

26. A magnetic head apparatus according to claim 15, wherein said flat surface consists of a first section and a second section spaced apart from each other in the radial direction of the magnetic disk, each of said first and second sections extending between the leading and trailing ends, and said gaps are formed in the first section.

27. A magnetic head apparatus according to claim 26, wherein said magnetic head comprises:
   a first magnetic core shaped like a ring and having a first flat surface segment opposing the magnetic disk and a read/write gap which is formed in the first flat surface segment and is one of the said gaps;
   a second magnetic core shaped like a ring, located downstream of the first core, and having a second flat surface segment opposing the magnetic disk and an erase gap which is formed in the second flat surface segment and is another of said gaps;
   a first slider connected to one side of said first and second cores, and having a third flat surface segment opposing the magnetic disk; and
   a second slider connected to the other side of said first and second cores, and having a fourth flat surface segment opposing the magnetic disk,
   wherein said first to fourth surface segments define said first section of said flat surface.

28. A magnetic head according to claim 27, wherein said second slider comprises a fifth flat surface segment adjacent said fourth flat surface segment and forming a portion of a second section of said flat surface.

29. A magnetic head apparatus for recording and reproducing data, on and from a flexible magnetic disk, comprising:
   a magnetic head; and
   a support mechanism for supporting said magnetic head, said support mechanism having a first axis extending in a radial direction of the disk and passing through a rotating center of the head, which is capable of rotating the head around the first axis, and which applies a pressing force to the head, air flowing in a circumferential direction of the disk, when the disk is rotated;
   said magnetic head comprising,
   a leading edge located upstream of the air flow,
   a trailing edge located downstream of the air flow,
   a flat surface opposing to the disk, and having a leading end and a trailing end respectively located upstream and downstream of the air flow, said flat surface having a midpoint between the leading and trailing ends thereof;
   magnetic gaps arranged on that portion of said flat surface which is located between the midpoint and the trailing end thereof, whereby, when the disk is rotated at a predetermined speed and the support mechanism applies a predetermined pressing force to the head, an air bearing force is generated and acts on said flat surface, and a first angular moment, which causes said head to rotate around the first axis in such a direction that the leading end moves away from the disk and the trailing end is pressed onto the disk, is generated, so that said magnetic gaps are located sufficiently close to the disk; and
   means for preventing a second angular moment, which would cause said head to rotate around the first axis in a direction opposite to the first angular moment-acting direction, from being generated, whereby the generation of the first annular moment is ensured;
   wherein said preventing means consists of said flat surface which is inclined to the magnetic disk such that the distance between the leading end and the magnetic disk is longer than the distance between the trailing end and the magnetic disk when the magnetic disk is stopped, whereby an angular moment for rotating the magnetic head increases when the flat surface is pressed onto the magnetic disk;
   wherein said support mechanism includes:
      a gimbal spring supporting said magnetic head, said gimbal spring having a predetermined elasticity; and
      a pivot having a pointed tip which contacts the gimbal spring and defines said rotating center, whereby said magnetic head receives a predetermined force from the pivot and is able to rotate around the first axis passing said rotating center;
   wherein said gimbal spring is inclined to the magnetic disk, whereby said flat surface is inclined to the magnetic disk.

30. A magnetic head apparatus according to claim 29, wherein that surface of the magnetic head which contacts said gimbal spring is inclined to said flat surface, whereby said flat surface is inclined to the magnetic disk.

31. In a magnetic head apparatus for recording and reproducing data, on and from a flexible double-sided magnetic disk placed between a pair of identical magnetic heads supported by respective support mechanisms, each said support mechanism having a first axis extending in a radial direction of the disk and passing through a rotating center of the respective head, each support mechanism capable of rotating the respective head around the first axis and applying a pressing force to the respective head with air flowing in a circumferential direction of the disk when the disk is rotated, the improvement comprising:
   each magnetic head comprising,
   a leading edge located upstream of the air flow, a trailing edge located downstream of the air flow,
a flat surface opposing to the disk, and having a leading end and a trailing end respectively located upstream and downstream of the air flow, said flat surface having a midpoint between the leading and trailing ends thereof,
magnetic gaps arranged on that portion of said flat surface which is located between the midpoint and the trailing end thereof, whereby, when the disk is rotated at a predetermined speed and the respective support mechanism applies a predetermined pressing force to the head, an air bearing force is generated and acts on said flat surface, and a first angular moment, which causes the head to rotate around the first axis in such a direction that the leading end moves away from the disk and the trailing end is pressed onto the disk, is generated, so that said magnetic gaps are located sufficiently close to the disk; and
means for preventing a second angular moment, which would cause said head to rotate around the first axis in a direction opposite to the first angular moment-acting direction, from being generated, whereby the generation of the first annular moment is ensured,
wherein said flat surface comprises an upstream section extending between the leading end and a line extending in the radial direction of the magnetic disk and crossing, at right angles, an action line along which a pressing force is applied from said rotating center to the magnetic head, and a downstream section extending between said line and the trailing end of said flat surface, and said preventing means comprises the upstream section and the downstream section which is smaller than the upstream section, whereby an angular moment acting on the upstream section is liable to be greater than an angular moment exerted on the downstream section, when the air bearing force is applied to the flat surface.

* * * * *